United States Patent
Yasumiishi et al.

(10) Patent No.: US 9,966,595 B2
(45) Date of Patent: May 8, 2018

(54) ELECTRODE MATERIAL FOR LITHIUM-ION SECONDARY BATTERY, ELECTRODE FOR LITHIUM-ION SECONDARY BATTERY, AND LITHIUM-ION SECONDARY BATTERY

(71) Applicant: SUMITOMO OSAKA CEMENT CO., LTD., Tokyo (JP)

(72) Inventors: Hirofumi Yasumiishi, Yachiyo (JP); Ryuuta Yamaya, Narashino (JP)

(73) Assignee: SUMITOMO OSAKA CEMENT CO., LTD., Tokyo (JP)

( * ) Notice: Subject to any disclaimer, the term of this patent is extended or adjusted under 35 U.S.C. 154(b) by 0 days. days.

(21) Appl. No.: 15/280,488

(22) Filed: Sep. 29, 2016

(65) Prior Publication Data

US 2017/0279112 A1    Sep. 28, 2017

(30) Foreign Application Priority Data

Mar. 28, 2016 (JP) ................. 2016-063910

(51) Int. Cl.
| | |
|---|---|
| *H01M 4/13* | (2010.01) |
| *H01M 4/136* | (2010.01) |
| *H01M 4/133* | (2010.01) |
| *H01M 4/1393* | (2010.01) |
| *H01M 4/1397* | (2010.01) |
| *H01M 4/36* | (2006.01) |
| *H01M 4/587* | (2010.01) |
| *H01M 10/0525* | (2010.01) |
| *H01M 4/04* | (2006.01) |
| *H01M 4/62* | (2006.01) |
| *H01M 4/58* | (2010.01) |

(52) U.S. Cl.
CPC ......... *H01M 4/136* (2013.01); *H01M 4/0471* (2013.01); *H01M 4/133* (2013.01); *H01M 4/1393* (2013.01); *H01M 4/1397* (2013.01); *H01M 4/366* (2013.01); *H01M 4/587* (2013.01); *H01M 4/625* (2013.01); *H01M 10/0525* (2013.01); H01M 4/5825 (2013.01); H01M 2220/30 (2013.01)

(58) Field of Classification Search
None
See application file for complete search history.

(56) References Cited

U.S. PATENT DOCUMENTS

| | | | |
|---|---|---|---|
| 2010/0133467 | A1 | 6/2010 | Ikegawa |
| 2011/0037019 | A1 | 2/2011 | Nakano |
| 2012/0049126 | A1* | 3/2012 | Park ....................... C04B 35/447 |
| | | | 252/506 |
| 2014/0298646 | A1 | 10/2014 | Ikegawa |
| 2016/0190583 | A1* | 6/2016 | Oshitari ............... H01M 4/5825 |
| | | | 429/221 |
| 2016/0293942 | A1* | 10/2016 | Yamamoto .............. C01B 25/45 |

FOREIGN PATENT DOCUMENTS

| | | |
|---|---|---|
| JP | 2001-015111 A | 1/2001 |
| JP | 2004-014340 A | 1/2004 |
| JP | 2004-014341 A | 1/2004 |
| JP | 2006-032241 A | 2/2006 |
| JP | 2009-048958 A | 3/2009 |
| JP | 2016-072027 A | 5/2016 |
| WO | 2008/105490 A | 9/2008 |
| WO | 2008/105490 A1 | 9/2008 |
| WO | 2009/131095 A | 10/2009 |
| WO | 2009/131095 A1 | 10/2009 |

* cited by examiner

*Primary Examiner* — Scott J Chmielecki
(74) *Attorney, Agent, or Firm* — Greenblum & Bernstein, P.L.C.

(57) ABSTRACT

An electrode material includes inorganic particles of $LiFe_xMn_{1-x-y}M_yPO_4$ and a carbonaceous film coating surfaces of the inorganic particles, and volume of micropores having micropore diameter of 2 to 10 nm is 3 to 11 $cm^3/g$. A method for manufacturing an electrode material includes immersing the inorganic particles in an aqueous solution having pH of 7.0 to 10.0; producing a slurry including the inorganic particles, a carbonaceous film precursor, and water; producing a dried substance of the slurry by drying the slurry; and calcinating the dried substance in a non-oxidative atmosphere of 500° C. to 1,000° C., and an amount of the carbonaceous film precursor blended into 100 parts by mass of the inorganic particles when converted to a carbon element is 1.0 to 5.0 parts by mass. An electrode includes the electrode material. A lithium-ion secondary battery includes a cathode; an anode; and a non-aqueous electrolyte, the cathode being the electrode.

6 Claims, No Drawings

ELECTRODE MATERIAL FOR LITHIUM-ION SECONDARY BATTERY, ELECTRODE FOR LITHIUM-ION SECONDARY BATTERY, AND LITHIUM-ION SECONDARY BATTERY

BACKGROUND OF THE INVENTION

Field of the Invention

The present invention relates to an electrode material for a lithium-ion secondary battery, an electrode for a lithium-ion secondary battery, and a lithium-ion secondary battery.

Priority is claimed on Japanese Patent Application No. 2016-063910, filed Mar. 28, 2016, the content of which is incorporated herein by reference.

Description of Related Art

Recently, in the rapid progress of technical development of clean energy, efforts to form earth-friendly environments such as the distribution of petroleum dependency-reduced, zero-emission, and power-saving products have become necessary. Particularly, recently, large-capacity storage batteries supplying electric energy to electric vehicles, large-capacity storage batteries supplying electric energy in the case of emergency or disaster, and secondary batteries supplying electric energy to mobile information devices, mobile information terminals, and the like have been attracting attention. As secondary batteries, for example, lead storage batteries, alkali storage batteries, lithium-ion batteries, and the like are known. Particularly, lithium-ion batteries are capable of achieving size reduction, weight reduction, and higher capacity and, furthermore, have excellent characteristics such as a high output and a high energy density. Due to these facts, lithium-ion secondary batteries have been commercialized as high-output power supplies for electric devices mainly including electric vehicles, and active development is underway throughout the globe regarding materials for next-generation lithium-ion secondary batteries.

In addition, recently, as collaboration of large-capacity storage batteries supplying electric energy and houses, home energy management systems (HEMS) have been attracting attention. HEMES is a system for managing automatic control, the optimization of electric power supply and demand, and the like and cleverly consuming energy by integrating information regarding domestic electricity and control systems such as smart home appliances, electric vehicles, and photovoltaic power generation.

Electrode active materials that are ordinarily used for cathodes of lithium-ion batteries in practical use at the moment are $LiCoO_2$ and $LiMnO_2$. However, Co is not evenly distributed in the Earth and is a rare resource, and this, in a case in which a large amount of Co is used, there is a problem in that the product costs increase and stable supply becomes difficult. Therefore, as alternative cathode active materials of $LiCoO_2$, active research and development is underway regarding cathode active materials such as spinal-based $LiMn_2O_4$, ternary $LiNi_{1/3}Mn_{1/3}Co_{1/3}O_2$, lithium iron oxide ($LiFeO_2$), and lithium iron phosphate ($LiFePO_4$). Among these cathode materials, $LiFePO_4$ having an olivine structure is attracting attention as a cathode material that is not only safe but also has no problem from the resource and cost viewpoint. Olivine-based cathode materials represented by $LiFePO_4$ include phosphorus as a constituent element and form a strong covalent bond with oxygen. Therefore, compared with cathode materials such as $LiCoO_2$, the olivine-based cathode material is a material which has no concern of emitting oxygen at a high temperature, also has no concern of a risk of ignition due to the oxidation and decomposition of electrolytic solutions, and has excellent safety.

However, in $LiFePO_4$ having the above-described advantages, there is a problem with poor electron conductivity. This poor electron conductivity is considered to result from the slow diffusion of lithium ions in the active material which is attributed to the structure and low electron conductivity. Therefore, as an electrode material having improved electron conductivity, for example, an electrode material in which multiple primary particles of an electrode active material made of $Li_xA_yB_zPO_4$ (A represents one or more selected from the group consisting of Co, Mn, Ni, Fe, Cu, and Cr, B represents one or more selected from the group consisting of Mg, Ca, Sr, Ba, Ti, Zn, B, Al, Ga, In, Si, Ge, Sc, Y, and rare earth elements, $0<x<2$, $0<y<1.0$, and $0\leq z<1.5$) gather so as to form secondary particles, carbon is interposed between the primary particles as an electron-conducting substance, and the surface of the electrode active material is coated with a carbonaceous film has been proposed. In addition, as a method for manufacturing the electrode material, a method in which a slurry including the electrode active material or a precursor of the electrode active material and an organic compound is sprayed and dried so as to generate a granulated body, and the granulated body is thermally treated in a non-oxidative atmosphere of 500° C. or higher and 1,000° or lower has been proposed (for example, refer to Japanese Laid-open Patent Publication No. 2004-014340, Japanese Laid-open Patent Publication No. 2004-014341, and Japanese Laid-open Patent Publication No. 2001-015111).

In addition, a cathode material for a lithium-ion secondary battery in which the content of carbon in a complex of $LiFePO_4$ and carbon is set in a range of 1 to 20% by mass (refer to Japanese Laid-open Patent Publication No. 2006-032241), a cathode active material for a lithium-ion secondary battery made of a lithium-containing phosphate agglomerate having an average particle diameter of 3 µm or less which is obtained by coating lithium-containing phosphate having an average particle diameter of 1 µm or less with a carbonaceous bonding agent and granulating the lithium-containing phosphate (refer to Japanese Laid-open Patent Publication No. 2009-048958), and the like have been proposed. In these cathode active materials, the density of the granulated body is improved, whereby it is possible to coat the cathode active material with a carbonaceous film in a uniform thickness and improve the battery characteristics. In addition, the density is improved, whereby the density of the cathode active material in electrodes can be increased, and the capacity can be increased, and furthermore, an increase in the density shortens the diffusion distance of lithium ions, enhances the diffusivity of lithium ions, and enables the improvement of ion conductivity in cathodes.

SUMMARY OF THE INVENTION

However, recently, even in electrode materials of lithium-ion batteries, there has been a demand for additional improvement of high-rate characteristics and cycle characteristics, and particularly, there is a demand for improvement of high-rate characteristics at a low temperature. However, in the electrode materials of Patent Documents 1 to 5, since a large amount of the carbonaceous film remains on the surface of the electrode active material, the thickness of the carbonaceous film increases, and this thick carbonaceous film serves as an obstacle for lithium diffusion. Therefore, the electrode materials of Patent Documents 1 to 5 have a problem in that the high-rate characteristics are degraded.

The present invention has been made in consideration of the above-described circumstances, and an object of the present invention is to provide an electrode material capable of improving the high-rate characteristics at a low temperature, an electrode including the electrode material, and a lithium-ion secondary battery including the electrode.

The present inventors and the like carried out intensive studies in order to solve the above-described problems. As a result, it was found that, when the amount of carbon and the volume of micropores having a predetermined micropore diameter are controlled in electrode materials, it is possible to improve the high-rate characteristics of lithium-ion secondary batteries at a low temperature. In addition, on the basis of this finding, the present inventors completed the present invention. That is, the present invention is as described below.

[1] An electrode material for a lithium-ion secondary battery including: inorganic particles represented by General Formula $LiFe_xMn_{1-x-y}M_yPO_4$ ($0.05 \leq x \leq 1.0$, $0 \leq y \leq 0.14$, here, M represents at least one element selected from Mg, Ca, Co, Sr, Ba, Ti, Zn, B, Al, Ga, In, Si, Ge, and rare earth elements); and a carbonaceous film that coats surfaces of the inorganic particles, in which a volume of micropores having a micropore diameter in a range of 2 nm or more and 10 nm or less is 3 $cm^3/g$ or more and 11 $cm^3/g$ or less.

[2] The electrode material for a lithium-ion secondary battery according to [1], in which an amount of carbon is 0.5% by mass or more and 3.5% by mass or less.

[3] The electrode material for a lithium-ion secondary battery according to [1] or [2], in which a powder resistance is 1,000 Ω·cm or less.

[4] A method for manufacturing an electrode material for a lithium-ion secondary battery, including: a step of immersing inorganic particles represented by General Formula $LiFe_xMn_{1-x-y}M_yPO_4$ ($0.05 \leq x \leq 1.0$, $0 \leq y \leq 0.14$, here, M represents at least one element selected from Mg, Ca, Co, Sr, Ba, Ti, Sn, B, Al, Ga, In, Si, Ge, and rare earth elements) in an aqueous solution having a pH of 7.0 or more and 10.0 or less; a step of producing a slurry including the inorganic particles immersed in the aqueous solution, a carbonaceous film precursor, and water; a step of producing a dried substance of the slurry by drying the slurry; and a step of calcinating the dried substance in a non-oxidative atmosphere of 500° C. or higher and 1,000° C. or lower, in which the carbonaceous film precursor is at least one element selected from the group consisting of glucose, fructose, galactose, mannose, maltose, sucrose, lactose, arabinose, glycogen, pectin, alginic acid, glucomannan, chitin, hyaluronic acid, chondroitin, agarose, polyethers, divalent alcohols, and trivalent alcohols, and an amount of the carbonaceous film precursor blended into 100 parts by mass of the inorganic particles when converted to a carbon element is 1.0 part by mass or more and 5.0 parts by mass or less.

[5] An electrode for a lithium-ion secondary battery including: the electrode material for a lithium-ion secondary battery according to any one of [1] to [3].

[6] A lithium-ion secondary battery including: a cathode; at anode; and a non-aqueous electrolyte, in which the cathode is the electrode for a lithium-ion secondary battery according to [5].

According to the present invention, it is possible to provide an electrode material capable of improving the high-rate characteristics at a low temperature, an electrode including the electrode material, an electrode material providing a lithium-ion secondary battery including the electrode, an electrode including the electrode material, and a lithium-ion secondary battery including the electrode.

DETAILED DESCRIPTION OF THE INVENTION

Hereinafter, the present invention will be described in detail, but the present invention is not limited to the following embodiment.

Electrode Material for Lithium-Ion Secondary Battery

An electrode material for a lithium-ion secondary battery of the present invention, (hereinafter, simply referred to as the electrode material) includes inorganic particles represented by General Formula $LiFe_xMn_{1-x-y}M_yPO_4$ ($0.05 \leq x \leq 1.0$, $0 \leq y \leq 0.14$, here, M represents at least one element selected from Mg, Ca, Co, Sr, Ba, Ti, Zn, B, Al, Ga, In, Si, Ge, and rare earth elements; and a carbonaceous film that coats surfaces of the inorganic particles, and the volume of micropores baling a micropore diameter in a range of 2 nm or more and 10 nm or less is 3 $cm^3/g$ or more and 11 $cm^3/g$ or less. Therefore, it is possible to make lithium ion migrate rapidly in an interface between the inorganic particles and the carbonaceous film and improve both electron conductivity and lithium ion conductivity in the electrode material. In addition, it becomes possible to achieve both high-speed electron covalent bonding to a reaction point and high-speed migration of lithium ions, and it is possible to realize electrode materials satisfying high-rate characteristics at a low temperature.

Inorganic Particles

The inorganic particles that are used in the electrode material of the present invention are inorganic particles represented by General Formula $LiFe_xMn_{1-x-y}M_yPO_4$ ($0.5 \leq x \leq 1.0$, $0 \leq y \leq 0.14$, here, M represents at least one element selected from Mg, Ca, Co, Sr, Ba, Ti, Z, B, Al, Ga, In, Si, Ge, and rare earth elements). Meanwhile, the rare earth element refers to the 15 elements of La, Ce, Pr, Nd, Pm, Sm, Eu, Gd, Tb, Dy, Ho, Er, Tm, Yb, and Lu which belong to the lanthanum series. In addition, the inorganic particles that are used in the electrode material of the present invention may be one kind of inorganic particles represented by General Formula $LiFe_xMn_{1-x-y}M_yPO_4$ or inorganic particles formed of a combination of two or more kinds thereof.

The specific surface area of the inorganic particles is preferably 5 $m^2/g$ or more and 20 $m^2/g$ or less and more preferably 9 $m^2/g$ or more and 13 $m^2/g$ or less. When the specific surface area of the inorganic particles is 5 $m^2/g$ or more, the time taken for lithium ions and electrons to migrate among the inorganic particles is shortened, and it is possible to make the output characteristics of lithium-ion secondary batteries favorable. When the specific surface area of the inorganic particles is 20 $m^2/g$ or less, it is possible to suppress the weight of the carbonaceous film being increased due to an increase in the specific surface area of the inorganic particles and increases the charge and discharge capacity.

Carbonaceous Film

The carbonaceous film coats the surfaces of the inorganic particles and improves the electron conductivity of the electrode material. The coating ratio of the carbonaceous film is preferably 50% or more and more preferably 70% or more. When the coating ration of the carbonaceous film is 50% or more, electron supply form the carbonaceous film becomes favorable, an intercalation and deintercalation reaction of lithium ions at the reaction points on the surfaces of the inorganic particles becomes fast, and the output characteristics are also improved.

The coating ratio of the carbonaceous film can be measured using a transmission electron microscope (TEM), an energy-dispersive X-ray spectroscope (EDX), or the like.

The average film thickness of the carbonaceous film is preferably 0.1 nm or more and 5.0 nm or less and more preferably 1.0 nm or more and 5.0 nm or less. When the average film thickness of the carbonaceous film is 0.1 nm or more, it is possible to sufficiently ensure the electron conductivity of the electrode material, consequently, the internal resistance of batteries decreases, and it is possible to suppress voltage drop at a high-speed charge and discharge rate. When average film thickness of the carbonaceous film is 5.0 nm or less, it is possible to suppress voltage drop at a high-speed charge and discharge rate which is caused by an increase in the migration distance of lithium ions in the carbonaceous film having a slow diffusion rate of lithium ions.

Meanwhile, the "internal resistance" mentioned herein mainly refers to the sum of charge migration resistance and lithium ion migration resistance. The charge migration resistance is inversely proportional to the film thickness of the carbonaceous film and the density and crystallinity of the carbonaceous film, and the lithium ion migration resistance is inversely proportional to the film thickness of the carbonaceous film and the density and crystallinity of the carbonaceous film.

As a method for evaluating the internal resistance, for example, a current-rest method or the like is used. In the current-rest method, the internal resistance is measured as the sum of wire resistance, contact resistance, charge migration resistance, lithium ion migration resistance, lithium reaction resistance in cathodes and anodes, interelectrode resistance determined by the distance between cathodes and anodes, the solvation of lithium ions, resistance regarding desolvation, and the solid electrolyte interface (SEI) migration resistance of lithium ions.

Amount of Carbon

The amount of carbon in the electrode material is preferably 0.5% by mass or more and 3.5% by mass or less, more preferably 0.7% by mass or more and 2.5% by mass or less, and still more preferably 0.8% by mass or more and 1.5% by mass or less.

When the amount of carbon in the electrode material is 0.5% by mass or more, the electron conductivity of the electrode material can be improved, and the high-output characteristics become favorable. In addition, when the amount of carbon in the electrode material is 3.5% by mass or less, it is possible to suppress an increase of the amount of carbon not contributing to the improvement of electron conductivity. Meanwhile, when the amount of carbon not contributing to the improvement of electron conductivity increases, there are cases in which the charge and discharge capacity decreases.

Volume of Micropores

The volume of micropores having a micropore diameter in a range of 2 nm or more and 10 nm or less in the electrode material is 3 cm$^3$/g or more and 11 cm$^3$/g or less, preferably 3 cm$^3$/g or more and 10 cm$^3$/g or less, more preferably 4 cm$^3$/g or more and 7.5 cm$^3$/g or less, and still more preferably 4.5 cm$^3$/g or more and 7 cm$^3$/g or less.

When the volume of micropores having a micropore diameter in a range of 2 nm or more and 10 nm or less in the electrode material is less than 3 cm$^3$/g or more than 11 cm$^3$/g, at least one of the high-rate characteristics and the cycle characteristics becomes poor.

Powder Resistance

The powder resistance of the electrode material is preferably 1,000 Ω·cm or less, more preferably 500 Ω·cm or less, and still more preferably 450 Ω·cm or less. The powder resistance of the electrode material can be measured using a four-terminal method in which the electrode material is injected into a mold and is pressed at a pressure of 16 kN so as to produce a compact, and four probes are brought into contact with the surface of the compact.

When the powder resistance of the electrode material is 1,000 Ω·cm or less, it is possible to improve the electron conductivity of electrodes for a lithium-ion secondary battery to which the electrode material is applied and make the high-rate characteristics at a low temperature favorable.

Method for Manufacturing Electrode Material

A method for manufacturing the electrode material of the present invention includes a step (A) of immersing inorganic particles represented by General Formula LiFe$_x$Mn$_{1-x-y}$M$_y$PO$_4$ (0.05≤x≤1.0, 0≤y≤0.14, here, M represents at least one element selected from Mg, Ca, Co, Sr, Ba, Tu, Zn, B, Al, Ga, In, Si, Ge, and rare earth elements) in an aqueous solution having a pH of 7.0 or more and 10.0 or less, a step (B) of producing a slurry including the inorganic particles immersed in the aqueous solution, a carbonaceous film precursor, and water, a step (C) of producing a dried substance of the slurry by drying the slurry, and a step (D) of calcinating the dried substance in a non-oxidative atmosphere of 500° C. or higher and 1,000° C. or lower.

Step (A)

In Step (A), the inorganic particles represented by General Formula LiFe$_x$Mn$_{1-x-y}$M$_y$PO$_4$ (0.05≤x≤1.0, 0≤y≤0.14, here M represents at least one element selected from Mg, Ca, Co, Sr, Ba, Ti, Zn, B, Al, Ga, In, Si, Ge, and rare earth elements) are immersed in an aqueous solution of having a pH of 7.0 or more and 10.0 or less.

The inorganic particles that are used in the method for manufacturing the electrode material are represented by General Formula LiFe$_x$Mn$_{1-x-y}$M$_y$PO$_4$ (0.05≤x≤1.0, 0≤y≤0.14, here M represents at least one element selected from Mg, Ca, Co, Sr, Ba, Ti, Zn, B, Al, Ga, In, Si, Ge, and rare earth elements).

For example, LiFe$_x$Mn$_{1-x-y}$M$_y$PO$_4$ can be obtained by hydrothermally synthesizing a slurry-form mixture obtained by mixing a Li source, a divalent iron salt, a phosphate compound, and water using a pressure-resistant airtight container. The Li source is, for example, one element selected from the group consisting of lithium salts such as lithium acetate (LiCH$_3$COO) and lithium chloride (LiCl) and lithium hydroxide (LiOH). Examples of the divalent iron salt include iron (II) chloride (FeCl$_2$), iron (II) acetate (Fe(CH$_3$COO)$_2$), iron (II) sulfate (FeSO$_4$), and the like. Examples of the phosphate compound include phosphoric acid (H$_3$PO$_4$), ammonium dihydrogen phosphate (NH$_4$H$_2$PO$_4$), diammonium phosphate ((NH$_4$)$_2$HPO$_4$), and the like.

Solution

The pH of the aqueous solution in which the inorganic particles are immersed is 7.0 or more and 10.0 or less, preferably 7.5 or more and 10.0 or less, more preferably 7.7 or more and 9.5 or less, and still more preferably 7.9 or more and 9.2 or less.

When the pH of the aqueous solution in which the inorganic particles are immersed is less than 7.0 or more than 10.0, there are cases in which it is difficult to generate fine iron oxide on the surface of the inorganic particles. Meanwhile, iron oxide generated in Step (B) is reduced by hydrogen that is emitted from the carbonaceous film precursor during the calcination of a dried substance described below, the iron oxide is removed from the electrode material, and micropores are formed in the carbonaceous film that coats the surfaces of the inorganic particles, whereby it is possible to control the volume of micropores having a micropore diameter in a range of 2 nm or more and 10 nm or less in the electrode material to 3 cm$^3$/g or more and 11 cm$^3$/g or less.

The aqueous solution in which the inorganic particles are immersed is not particularly limited as long as the pH of the aqueous solution is 7.0 or more and 10.0 or less, preferably 7.5 or more and 10.0 or less, more preferably 7.7 or more and 9.5 or less, and still more preferably 7.9 or more and 9.2 or less. The aqueous solution is, for example, an aqueous solution including at least one element selected from the group consisting of LiOH and NH$_3$.

The immersion duration during which the inorganic particles are immersed is preferably 1 hour or more and 24 hours or less and more preferably 2 hours or more and 12 hours or less from the viewpoint of sufficient generation of iron oxide from the inorganic particles.

Step (B)

In the step (B), a slurry including the inorganic particles immersed in the aqueous solution, the carbonaceous film precursor, and water is produced.

The amount of the carbonaceous film precursor blended into 100 parts by mass of the inorganic particles when converted to a carbon element is 1.0 part by mass or more and 5.0 parts by mass or less and preferably 2.5 parts by mass or more and 10 parts by mass or less. When the amount of the carbonaceous film precursor blended into 100 parts by mass of the inorganic particles when converted to a carbon element is 1.0 part by mass or more and 5.0 parts by mass or less, it is possible to set the amount of carbon in the electrode material to approximately 0.5% by mass or more and 3.5% by mass or less.

The carbonaceous film precursor is at least one element selected from the group consisting of glucose, fructose, galactose, mannose, maltose, sucrose, lactose, arabinose, glycogen, pectin, alginic acid, glucomannan, chitin, hyaluronic acid, chondroitin, agarose, polyethers, divalent alcohols, and trivalent alcohols, and the carbonaceous film precursor is preferably at least one element selected from the group consisting of fructose and lactose. The carbonaceous film precursor contains a relatively large amount of oxygen in the structure. Therefore, the use of the carbonaceous film precursor increases the number of places in which a carbon layer is cleaved during calcination and facilitates the formation of micropores in the carbon layer. In addition, it becomes possible to obtain electrode materials for a lithium-ion secondary battery in which the volume or micropores having a micropore diameter in a range of 2 nm or more and 10 nm or less is 3 cm$^3$/g or more and 11 cm$^3$/g or less.

The blending ratio of the entire organic compound that is blended during the production of the slurry to the inorganic particles is preferably 0.5 parts by mass or more and 5.0 parts by mass or less with respect to 100 parts by mass of the inorganic particles when the total amount of the organic compound is converted to the amount of carbon.

Here, when the blending ratio of the organic compound in terms of the amount of carbon is 0.5 parts by mass or more, the discharge capacity at a high-speed charge and discharge rate increases in a case in which secondary batteries are formed, and it becomes possible to realize sufficient charge and discharge rate performance. When the blending ratio of the organic compound in terms of the amount of carbon is 5.0 parts by mass or less, it is possible to set the average film thickness of the carbonaceous film to 5 nm or less.

The inorganic particles and the carbonaceous film precursor are dissolved or dispersed in water, thereby preparing a homogeneous slurry. During the dissolution or dispersion, a dispersant may be added thereto.

A method for dissolving or dispersing the inorganic particles and the carbonaceous film precursor in water is not particularly limited as long as the inorganic particles are dispersed, and the carbonaceous film precursor is dissolved or dispersed. Examples of an apparatus for dissolving or dispersing the carbonaceous film precursor include a medium stirring-type dispersing apparatus that stirs medium particles at a high speed such as a planetary ball mill, an oscillation ball mill, a bead mill, a paint shaker, or an attritor.

During the dissolution or dispersion, it is preferable to disperse the inorganic particles in a primary particle form, then, add the carbonaceous film precursor thereto, and stir the components. In such a case, the surfaces of the primary particles of the inorganic particles are coated with the carbonaceous film precursor, and consequently, carbon derived from the carbonaceous film precursor is uniformly interposed among the primary particles of the inorganic particles.

Step (C)

In the step (C), the slurry is dried, thereby producing a dried substance of the slurry. For example, the slurry is sprayed and dried in a high-temperature atmosphere, for example, in the atmosphere at 70° C. or higher and 250° C. or lower.

Step (D)

In the step (D), the dried substance is calcinated at a calcination temperature of 500° C. or higher and 1,000° C. or lower and preferably 600° C. or higher and 900° C. or lower. The calcination duration is, for example, 0.1 hours or longer and 40 hours or shorter.

As described above, iron oxide generated in the step (B) is reduced by hydrogen that is emitted from the organic compound in this step, and the iron oxide is removed from the electrode material. In addition, micropores are formed in the carbonaceous film that coats the surfaces of the inorganic particles, whereby it is possible to control the volume of micropores having a micropore diameter in a range of 2 nm or more and 10 nm or leas in the electrode material to 3 cm$^3$/g or more and 11 cm$^3$/g or less.

When the calcination temperature is lower than 500° C., the decomposition and reaction of the organic compound in the dried substance obtained by drying the slurry does not sufficiently proceed, and there are cases in which the organic compound is not sufficiently carbonized. As a result, there are cases in which a high-resistance decomposed substance of the organic compound is generated in the obtained electrode material. When the calcination temperature is higher than 1,000° C., there are cases in which Li in the inorganic particles is evaporated and thus the composition of the inorganic particles is deviated. When the composition is deviated, the grain growth of the inorganic particles is accelerated, consequently, the discharge capacity at a high-speed charge and discharge rate is decreased, and there are cases in which it is difficult to realize sufficient charge and discharge rate performance.

The non-oxidative atmosphere is preferably an inert atmosphere filled with nitrogen (N$_2$), argon (Ar), or the like, and, in a case in which it is more necessary to suppress oxidation, a reducing atmosphere including approximately several percent by volume of a reducing gas such as hydrogen (H$_2$) is preferred.

In this calcination step, it is possible to control the micropore diameter distribution of the electrode material to be obtained by appropriately adjusting the conditions for calcinating the dried substance of the slurry, for example, the temperature-rise rate, the peak holding temperature, the holding duration, and the like.

By means of the above-described steps, the surfaces of the primary particles of the inorganic particles are coated with carbon generated by the thermal decomposition of the organic compound in the dried substance, and an electrode material made or secondary particles in which carbon is interposed between the primary particles of the inorganic particles can be obtained.

Electrode for Lithium-Ion Secondary Battery

An electrode for a lithium-ion secondary battery of the present invention (hereinafter, simply referred to as the electrode) includes the electrode material of the present invention.

In order to produce an electrode of the present embodiment, the electrode material, a binding agent made of a binder resin, and a solvent are mixed together, thereby preparing paint for electrode formation or paste for electrode formation. At this time, a conductive auxiliary agent such as carbon black may be added thereto if necessary.

As the binding agent, that is, the binder resin, for example, a polytetrafluoroethylene (PTFE) resin, a polyvinylidene fluoride (PVdF) resin, fluorine rubber, or the like is preferably used.

The amount of the binder resin blended into the electrode material is not particularly limited and is, for example, set to 1 part by mass or more and 30 parts by mass or less and preferably set to 3 parts by mass or more and 20 parts by mass or less with respect to 100 parts by mass of the electrode material.

Examples of the solvent that is used for the paint for electrode formation and the paste for electrode formation include water; alcohols such as methanol, ethanol, 1-propanol, 2-propanol (isopropyl alcohol: IPA), butanol, pentanol, hexanol, octanol, and diacetone alcohol, esters such as ethyl acetate, butyl acetate, ethyl lactate, propylene glycol monomethyl ether acetate, propylene glycol monoethyl ether acetate, and γ-butyrolactone, ethers such as diethyl ether, ethylene glycol monomethyl ether (methyl cellosolve), ethylene glycol monoethyl ether (ethyl cellosolve), ethylene glycerol monobutyl ether (butyl cellosolve), diethylene glycol monomethyl ether, and diethylene glycol monoethyl ether, ketones such as acetone, methyl ethyl ketone (MEK), methyl isobutyl ketone (MIBK), acetyl acetone, and cyclohexanone, amides such as dimethyl formamide, N,N-dimethylacetoacetamide, and N-methyl pyrrolidone, glycols such as ethylene glycol, diethylene glycol, and propylene glycol, and the like. These aqueous solvents may be singly used or in a mixture form of two or more aqueous solvents.

Next, the paint for electrode formation or the paste for electrode formation is applied to one surface of a metal foil and then is dried, thereby obtaining the metal foil in which a coated film made of a mixture of the electrode material and the binder resin is formed on one surface.

Next, the coated film is pressed by pressure and dried, thereby producing a current collector (electrode) having an electrode material layer on one surface of the metal foil.

In the above-described manner, it is possible to produce electrodes capable of improving electron conductivity without impairing the lithium-ion conductivity of the present embodiment.

Lithium-Ion Secondary Battery

A lithium-ion secondary battery of the present invention has the electrode of the present invention as a cathode.

In the lithium-ion secondary battery, since the electrode of the present invention is used as the cathode, it is possible to suppress the internal resistance at a low level. As a result, there is no concern that the voltage may significantly drop, and it is possible to provide lithium-ion secondary batteries capable of high-speed charge and discharge.

EXAMPLES

Hereinafter, the present invention will be described in detail using examples, but the present invention is not limited to the following examples.

Specimens of Examples 1 to 6 and Comparative Examples 1 to 6 were produced in the following manner.

Example 1

Production of Electrode Material

Lithium acetate ($LiCH_3COO$) (4 mol), iron (II) sulfate ($FeSO_4$) (2 mol), and phosphoric acid ($H_3PO_4$) (2 mol) were mixed with water (2 L (liter)) so that the total amount reached 4 L, thereby preparing a homogenous slurry-form mixture.

Next, this mixture was stored in a pressure-resistant airtight container having a capacity of 8 L and was hydrothermally synthesized at 120° C. for one hour.

Next, the obtained precipitate was washed with water, thereby obtaining a cake-form electrode active material (inorganic particles).

Next, the electrode active material was immersed in an aqueous solution of lithium hydroxide prepared so that the pH reached 7.6, thereby treating the surface.

Next, this electrode active material (75 g in terms of solid contents), water (175 g), and zirconia beads having a diameter or 0.1 mm (250 g) as a medium were injected into a ball mill, and a dispersion treatment was carried out, thereby obtaining a slurry.

Next, lactose (3.4 g) was injected into the obtained slurry, was stirred for 12 hours, was sprayed in the atmosphere at 180° C., and was dried, thereby obtaining a dried substance.

Next, the obtained dried substance was calcinated in a nitrogen atmosphere at 800° C. for 0.5 hours, thereby obtaining a specimen of Example 1.

Example 2

A specimen of Example 2 was produced in the same manner as in Example 1 except for the fact that an aqueous solution of lithium hydroxide was prepared so that the pH reached 8.5.

Example 3

A specimen of Example 3 was produced in the same manner as in Example 1 except for the fact that an aqueous solution of lithium hydroxide was prepared so that the pH reached 9.2.

Example 4

A specimen of Example 4 was produced in the same manner as in Example 1 except for the fact that an aqueous solution of lithium hydroxide was prepared so that the pH reached 7.6 and fructose (3.4 g) was injected as a carbon raw material.

Example 5

A specimen of Example 5 was produced in the same manner as in Example 4 except for the fact that an aqueous solution of lithium hydroxide was prepared so that the pH reached 8.5.

Example 6

A specimen of Example 6 was produced in the same manner as in Example 4 except for the fact that an aqueous solution of lithium hydroxide was prepared so that the pH reached 9.2.

Comparative Example 1

A specimen of Comparative Example 1 was produced in the same manner as in Example 1 except for the fact that the pH of the aqueous solution of lithium hydroxide used in the production of the specimen of Example 1 was set to 7.6 and polyvinyl alcohol (2.7 g) was injected.

Comparative Example 2

A specimen of Comparative Example 2 was produced in the same manner as in Example 1 except for the fact that the pH of the aqueous solution of lithium hydroxide used in the production of the specimen of Example 1 was set to 8.5 and polyvinyl alcohol (2.7 g) was injected.

Comparative Example 3

A specimen of Comparative Example 3 was produced in the same manner as in Example 1 except for the fact that the pH of the aqueous solution of lithium hydroxide used in the production of the specimen of Example 1 was set to 9.2 and polyvinyl alcohol (2.7 g) was injected.

Comparative Example 4

A specimen of Comparative Example 4 was produced in the same manner as in Example 1 except for the fact that the pH of the aqueous solution of lithium hydroxide used in the production of the specimen of Example 1 was set to 8.5 and phenol (1.9 g) was injected.

Comparative Example 5

A specimen of Comparative Example 5 was produced in the same manner as in Example 1 except for the fact that an aqueous solution of lithium hydroxide was prepared so that the pH reached 10.5.

Comparative Example 6

A specimen of Comparative Example 6 was produced in the same manner as in Example 1 except for the fact that an aqueous solution of lithium hydroxide was prepared so that the pH reached 12.

Evaluation of Electrode Materials

On the specimens of Examples 1 to 6 and Comparative Examples 1 to 6, the following evaluations were performed.

(1) Volume or Micropores Having Micropore Diameter in Range of 2 nm or More and 10 nm or Less A nitrogen adsorption measurement was performed using a nitrogen adsorption measurement instrument (manufactured by MicrotracBEL Corp., model No.: BELSORP-max), the micropore distributions of the specimens of Example 1 to 6 and Comparative Examples 1 to 6 having a micropore diameter in a range of 2 nm or more and 10 nm or less were analyzed using an INNES method, relative pressures corresponding to the micropore diameters of 2 nm or more and 10 nm or less were obtained, and the volumes of micropores of 2 nm or more and 10 nm or leas were obtained from the micropore adsorption amount of nitrogen in adsorption isotherms.

(2) Amount of Carbon

The amounts of carbon of the specimens of example 1 to 6 and Comparative Examples 1 to 6 were measured using a carbon analyzer (manufactured by Horiba Ltd., model No.: EMIA-920V).

(3) Specific Surface Area

The specific surface areas of the electrode active materials in the specimens of Example 1 to 6 and Comparative Examples 1 to 6 were respectively measured using a specific surface area meter (manufactured by Mountech Co., Ltd., model No.: MacsorbHM MODEL 1208).

(4) Powder Resistance

The specimens of Example 1 to 6 and Comparative Examples 1 to 6 were respectively injected into a mold and were pressed at a pressure of 16 kN, thereby respectively producing compacts. The powder resistances of the specimens of Example 1 to 6 and Comparative Examples 1 to 6 were measured using a four-terminal method in which four probes were brought into contact with the surface of the compact.

(5) 10C Discharge Capacity at 0° C.

The 10C discharge capacity at 0° C. was evaluated using lithium-ion secondary batteries produced using the specimens of Example 1 to 6 and Comparative Examples 1 to 6.

Production of Lithium-Ion Battery

Each of the specimens of Example 1 to 6 and Comparative Examples 1 to 6 as an electrode material, polyvinylidene fluoride (PVdF) as a binder, and acetylene black (AB) as a conductive auxiliary agent were mixed together so that the mass ratio reached 90:5:5, and furthermore, N-methyl-2-pyrrolidone (NMP) was added thereto as a solvent so as to impart flowability, thereby producing a slurry.

Next, the slurry was applied onto a 15 μm-thick aluminum (Al) foil and was dried. After that, the slurry was pressed at a pressure of 600 kgf/cm$^2$, thereby producing a cathode for a lithium-ion secondary battery having an electrode area of 2 square centimeters and an electrode density of 1.6 g/cc.

The cathode and a lithium metal piece as an anode were disposed in a coin cell container having a diameter of 2 cm and a thickness of 3.2 mm, and a porous polypropylene separator having a thickness of 25 μm was disposed between the cathode and the anode, thereby producing a member for a battery.

Meanwhile, ethylene carbonate and ethyl methyl carbonate were mixed together at (a mass ratio of) 1:1, and furthermore, a 1 M LiPF$_6$ solution was added, thereby producing an electrolyte solution having lithium-ion conductivity.

Next, the member for a battery was immersed in the electrolyte solution, thereby producing a lithium-ion secondary battery.

Charge and Discharge Capacity

The 10C discharge capacity 0° C. of the produced lithium-ion secondary battery was computed using a battery charge and discharge device (manufactured by Hokuto Denko Corp., Model No.: SMB).

TABLE 1

|  | Carbon Source | Amount of carbon source injected % | pH of surface treatment solution | Volume of micropores in a range of 2 to 10 mm cm³/g | Amount of C % | BET m²/g | Powder resistance Ω · cm | 10 C discharge capacity @ 0° C. [mAh/g] |
| --- | --- | --- | --- | --- | --- | --- | --- | --- |
| Example 1 | Lactose | 2 | 7.6 | 4.01 | 1.45 | 14.5 | 782 | 100 |
| Example 2 | Lactose | 2 | 8.5 | 6.35 | 1.38 | 14.4 | 814 | 105 |
| Example 3 | Lactose | 2 | 9.2 | 8.38 | 1.32 | 14.6 | 863 | 111 |
| Example 4 | Fructose | 2 | 7.6 | 4.13 | 1.46 | 14.8 | 806 | 102 |
| Example 5 | Fructose | 2 | 8.5 | 6.53 | 1.38 | 14.1 | 853 | 104 |
| Example 6 | Fructose | 2 | 9.2 | 8.12 | 1.31 | 14.9 | 867 | 113 |
| Comparative Example 1 | PVA | 2 | 7.6 | 2.04 | 1.40 | 14.3 | 295 | 83 |
| Comparative Example 2 | PVA | 2 | 8.5 | 2.68 | 1.34 | 14.6 | 386 | 80 |
| Comparative Example 3 | PVA | 2 | 9.2 | 2.95 | 1.28 | 15.0 | 521 | 83 |
| Comparative Example 4 | Phenol | 2 | 8.5 | 1.82 | 1.75 | 17.5 | 313 | 50 |
| Comparative Example 5 | Lactose | 2 | 10.5 | 11.39 | 1.22 | 13.6 | 1062 | 91 |
| Comparative Example 6 | Lactose | 2 | 12.0 | 11.77 | 1.20 | 13.1 | 1288 | 81 |

From the comparison between Examples 1 to 6 and Comparative Examples 1 to 6, it was found that, when an electrode material in which the column of micropores having a micropore diameter in a range of 2 nm or more and 10 nm or less is 3 cm³/g or more and 11 cm³/g or less is used, the high-rate characteristics of the lithium-ion secondary batteries at a low temperature become favorable.

In addition, from the comparison between Examples 1 to 6 and Comparative Examples 1 to 6, it was found that, when lactose or fructose is used as a carbon source, and inorganic particles are immersed in an aqueous solution having a pH of 7.0 or more and 10.0 or less, it is possible to obtain electrode materials capable of improving the high-rate characteristics at a low temperature.

What is claimed is:

1. An electrode material for a lithium-ion secondary battery comprising:
    inorganic particles represented by General Formula $LiFe_xMn_{1-x-y}M_yPO_4$ ($0.05 \leq x \leq 1.0$, $0 \leq y \leq 0.14$, here, M represents at least one element selected from Mg, Ca, Co, Sr, Ba, Ti, Zn, B, Al, Ga, In, Si, Ge, and rare earth elements); and
    a carbonaceous film that coats surfaces of the inorganic particles,
        wherein the electrode material for a lithium-ion secondary battery has a pore volume of 3 cm³/g or more and 11 cm³/g or less in the case of a pore diameter range of 2 nm or more and 10 nm or less.

2. The electrode material for a lithium-ion secondary battery according to claim 1, having a carbon content of 0.5% by mass or more and 3.5% by mass or less.

3. The electrode material for a lithium-ion secondary battery according to claim 1,
    wherein a powder resistance of the electrode material for a lithium-ion secondary battery is 1,000 Ω·cm or less, the powder resistance can be measured using a four-terminal method in which four probes are brought into contact with the surface of a compact, and the compact is obtained by injecting the electrode material into a mold, and pressing of 16 kN.

4. A method for manufacturing an electrode material for a lithium-ion secondary battery, comprising:
    a step of immersing inorganic particles represented by General Formula $LiFe_xMn_{1-x-y}M_yPO_4$ ($0.05 \leq x \leq 1.0$, $0 \leq y \leq 0.14$, here, M represents at least one element selected from Mg, Ca, Co, Sr, Ba, Ti, Zn, B, Al, Ga, In, Si, Ge, and rare earth elements) in an aqueous solution having a pH of 7.6 or more and 9.2 or less;
    a step of producing a slurry including the inorganic particles immersed in the aqueous solution, a carbonaceous film precursor, and water;
    a step of producing a dried substance of the slurry by drying the slurry; and
    a step of calcinating the dried substance in a non-oxidative atmosphere at a temperature of 500° C. or higher and 1,000° C. or lower,
    wherein the carbonaceous film precursor is at least one element selected from the group consisting of glucose, fructose, galactose, mannose, maltose, sucrose, lactose, arabinose, glycogen, pectin, alginic acid, glucomannan, chitin, hyaluronic acid, chondroitin, agarose, polyethers, divalent alcohols, and trivalent alcohols,
    an amount of the carbonaceous film precursor in terms of a carbon element to 100 parts by mass of the inorganic particles is 1.0 part by mass or more and 5.0 parts by mass or less; and
    wherein the electrode material has a pore volume of 3 cm³/g or more and 11 cm³/g or less in the case of a pore diameter range of 2 nm or more and 10 nm or less.

5. An electrode for a lithium-ion secondary battery comprising:
    the electrode material for a lithium-ion secondary battery according to claim 1.

6. A lithium-ion secondary battery comprising:
    a cathode being the electrode for a lithium-ion secondary battery according to claim 5;
    an anode; and
    a non-aqueous electrolyte.

* * * * *